US009069708B2

(12) United States Patent
Gill et al.

(10) Patent No.: US 9,069,708 B2
(45) Date of Patent: Jun. 30, 2015

(54) METHOD AND SYSTEM FOR IMPLEMENTING CONSISTENCY GROUPS WITH VIRTUAL MACHINES

(71) Applicant: Nutanix, Inc., San Jose, CA (US)

(72) Inventors: Binny Sher Gill, San Jose, CA (US); Brian Byrne, San Jose, CA (US); Mohit Aron, Los Altos, CA (US)

(73) Assignee: NUTANIX, INC., San Jose, CA (US)

( * ) Notice: Subject to any disclaimer, the term of this patent is extended or adjusted under 35 U.S.C. 154(b) by 209 days.

(21) Appl. No.: 13/728,403

(22) Filed: Dec. 27, 2012

(65) Prior Publication Data

US 2014/0189429 A1 Jul. 3, 2014

(51) Int. Cl.
  *G06F 11/00* (2006.01)
  *G06F 11/14* (2006.01)
  *G06F 9/455* (2006.01)

(52) U.S. Cl.
  CPC ........ *G06F 11/1446* (2013.01); *G06F 9/45533* (2013.01); *G06F 9/45558* (2013.01); *G06F 2009/45575* (2013.01)

(58) Field of Classification Search
  CPC .................................................. G06F 11/1446
  USPC ..................... 714/2, 15, 18, 19, 20
  See application file for complete search history.

(56) References Cited

U.S. PATENT DOCUMENTS

| 6,549,992 | B1 | 4/2003 | Armangau et al. |
| 7,529,897 | B1 * | 5/2009 | Waldspurger et al. ........ 711/162 |
| 8,117,410 | B2 * | 2/2012 | Lu et al. ........................ 711/162 |
| 8,495,317 | B2 * | 7/2013 | Chandra et al. ............... 711/162 |
| 8,601,473 | B1 | 12/2013 | Aron et al. |
| 8,850,130 | B1 | 9/2014 | Aron et al. |
| 2007/0136389 | A1 | 6/2007 | Bergant et al. |
| 2010/0011178 | A1 | 1/2010 | Feathergill |
| 2010/0076934 | A1 * | 3/2010 | Pershin et al. ................ 707/640 |
| 2012/0271797 | A1 | 10/2012 | Patil |
| 2014/0068127 | A1 * | 3/2014 | Baron et al. .................. 710/200 |
| 2014/0096134 | A1 * | 4/2014 | Barak et al. ..................... 718/1 |

OTHER PUBLICATIONS

International Search Report and Written Opinion dated Jul. 15, 2014 for related PCT Patent Application No. PCT/US13/77865, 11 pages.
Hitz, et al., "File System Design for an NFS File Server Appliance", Network Appliance, USENIX, San Francisco, CA, 1994, 23 pages.
Zhu, et al., "Avoiding the Disk Bottleneck in the Data Domain Deduplication File System", Usenix Association, FAST 2008, 6th USENIX Conference on File and Storage Technologies, 14 pages.
EMC Corporation, "EMC Avamar Backup and Recovery for VMware Environments", Applied Technology EMC, Aug. 2010, 18 pages.

* cited by examiner

*Primary Examiner* — Dieu-Minh Le
(74) *Attorney, Agent, or Firm* — Vista IP Law Group, LLP

(57) ABSTRACT

Disclosed is an approach for implementing disaster recovery for virtual machines. Consistency groups are implemented for virtual machines, where the consistency group link together two or more VMs. The consistency group includes any set of VMs which need to be managed on a consistent basis in the event of a disaster recovery scenario.

36 Claims, 9 Drawing Sheets

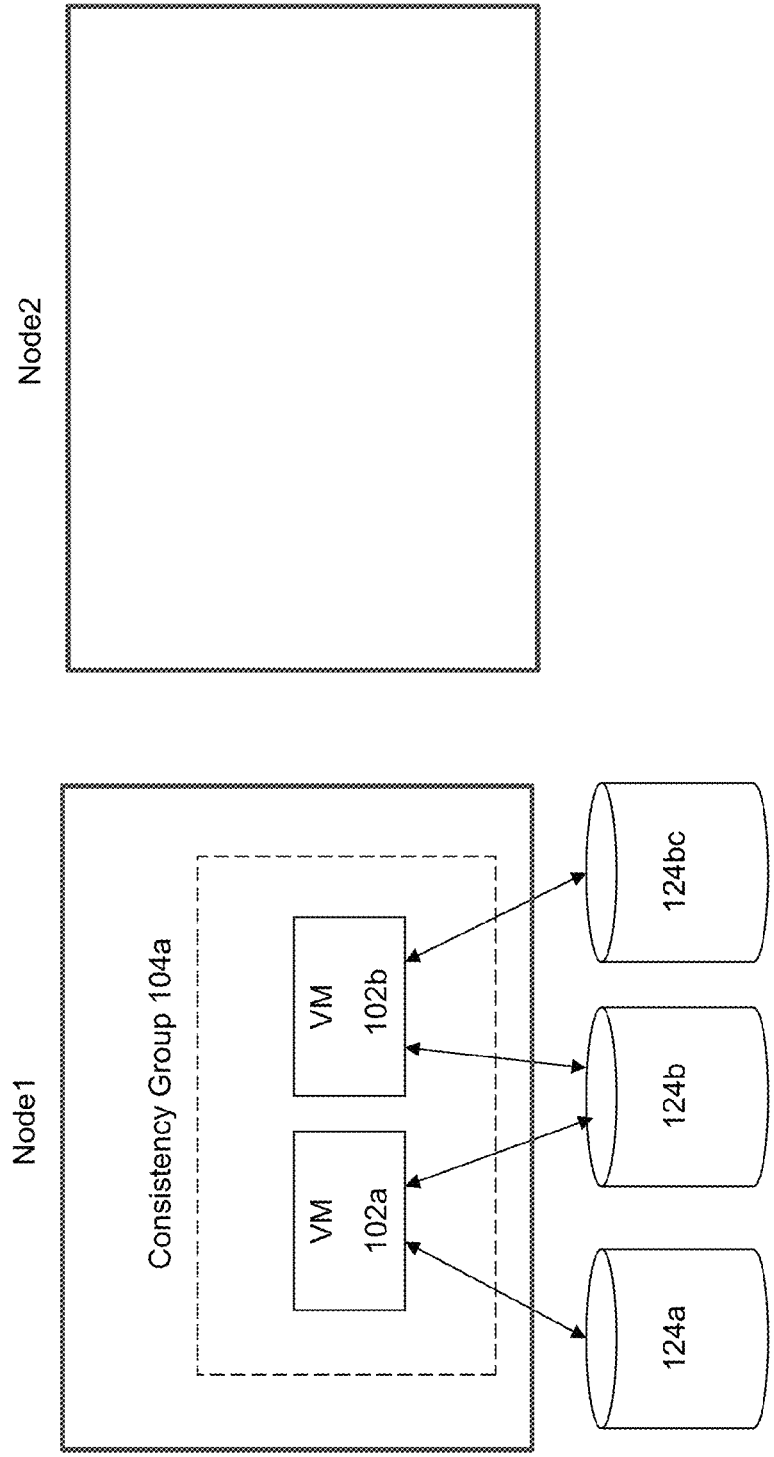

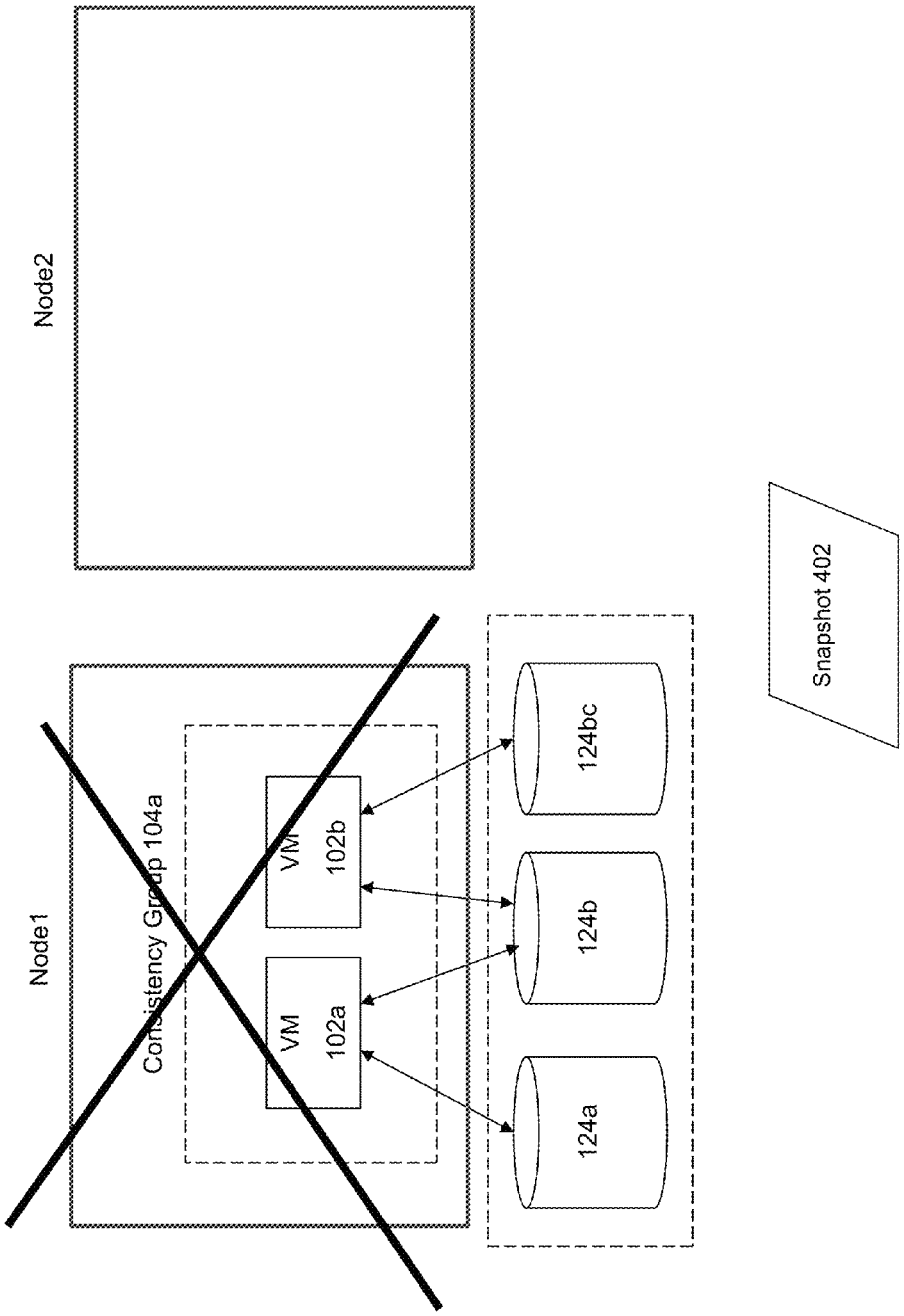

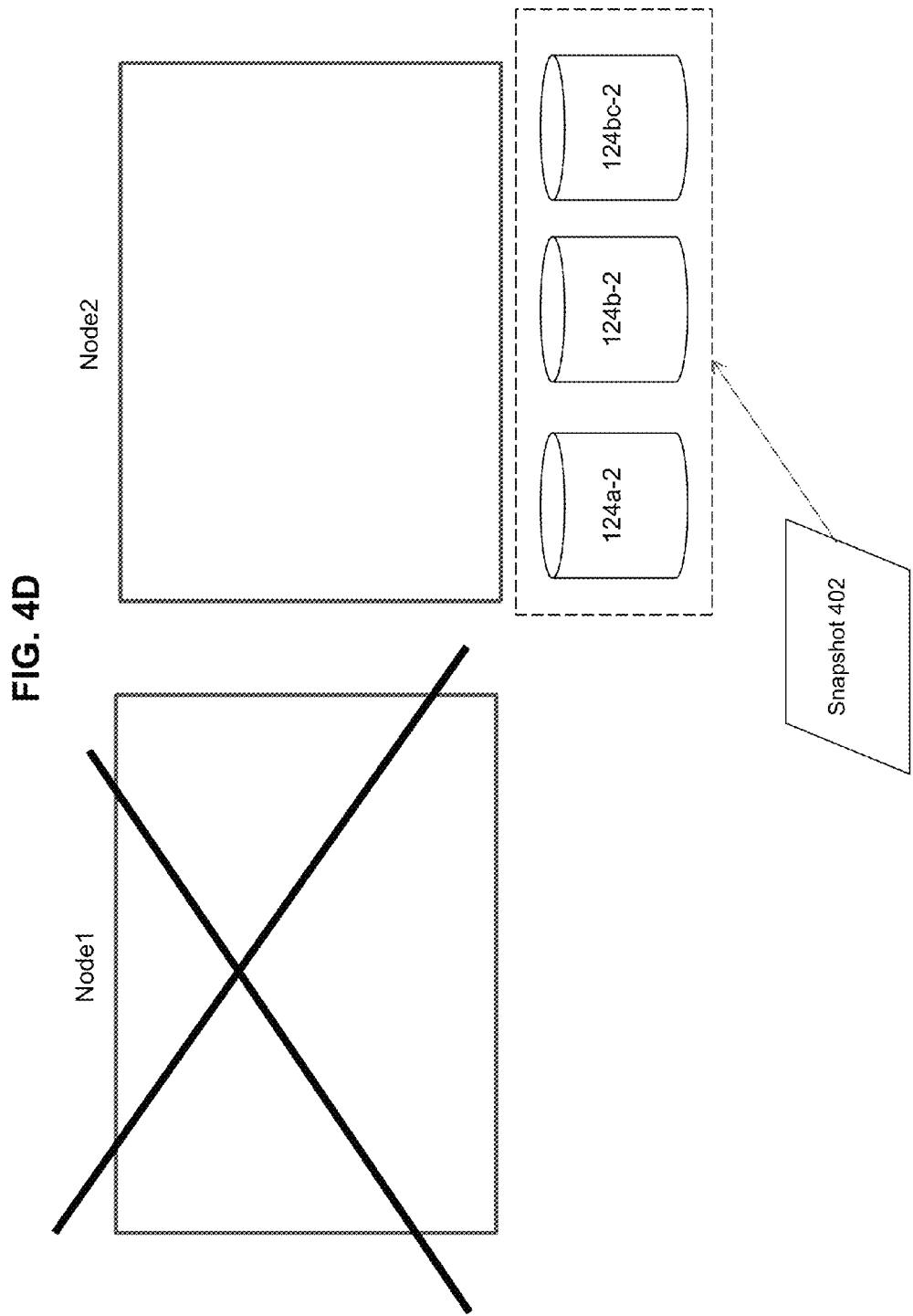

METHOD AND SYSTEM FOR IMPLEMENTING CONSISTENCY GROUPS WITH VIRTUAL MACHINES

FIELD

This disclosure concerns virtual machine and storage technology.

BACKGROUND

There are many kinds of architectures that can be used to implement storage systems. Traditionally, storage for a computing system is implemented using directly attached or integrated storage, such as hard disk drives that are commonly integrated into personal computers. Distributed storage architectures are also widely used, to allow a computer to access and store data on networked based storage devices.

Modern computing systems may also implement storage in the context of virtualization environments. A virtualization environment contains one or more "virtual machines" or "VMs", which are software-based implementation of a machine in an environment in which the hardware resources of a real computer (e.g., CPU, memory, storage, etc.) are virtualized or transformed into the underlying support for the fully functional virtual machine that can run its own operating system and applications on the underlying physical resources just like a real computer. By encapsulating an entire machine, including CPU, memory, operating system, storage devices, and network devices, a virtual machine is completely compatible with most standard operating systems, applications, and device drivers. Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Storage devices comprise one type of a physical resource that can be managed and utilized in a virtualization environment. A set of one or more virtual disks may be implemented to allow virtual storage of data on behalf of one or more clients, such as client computers, systems, applications, or virtual machines, where the virtual disk (or "vdisk") is actually a logical representation of storage space compiled from one or more physical underlying storage devices. When the client issues a write request or read request in a virtualized system, that request is actually issued to a virtualized storage device.

The topic addressed by the present disclosure pertains to disaster recovery scenarios involving VMs. Modern organizations have come to the realization that processes and procedures need to be put into place to address the possibility of disasters and failures, both natural or human-induced, that may affect the computing equipment used by the organization. As computing and information technology systems have become increasingly critical to the operations of an organization, the importance of ensuring the continued operation of those systems has increased.

SUMMARY

Embodiments of the present invention provide an improved approach for implementing disaster recovery for VMs. In some embodiments of the invention, consistency groups are implemented for virtual machines, where the consistency group links together two or more VMs. The consistency group includes any set of VMs which need to be managed on a consistent basis in the event of a disaster recovery scenario. In some embodiments, the consistency groups are "non-intrusive" to the VM or applications on the VM, e.g., in which no special hooks are required in the VM/application to ensure that a collection of VMs can be snapshotted such that they are consistent.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIGS. 4A-E illustrate implementation of VM-based consistency groups according to some embodiments of the invention.

DETAILED DESCRIPTION OF THE EMBODIMENTS OF THE INVENTION

Embodiments of the present invention provide an improved approach for implementing disaster recovery for VMs. In some embodiments of the invention, consistency groups are implemented for virtual machines, where the consistency group links together two or more VMs. The consistency group includes any set of VMs which need to be managed on a consistent basis in the event of a disaster recovery scenario.

Figure 1:
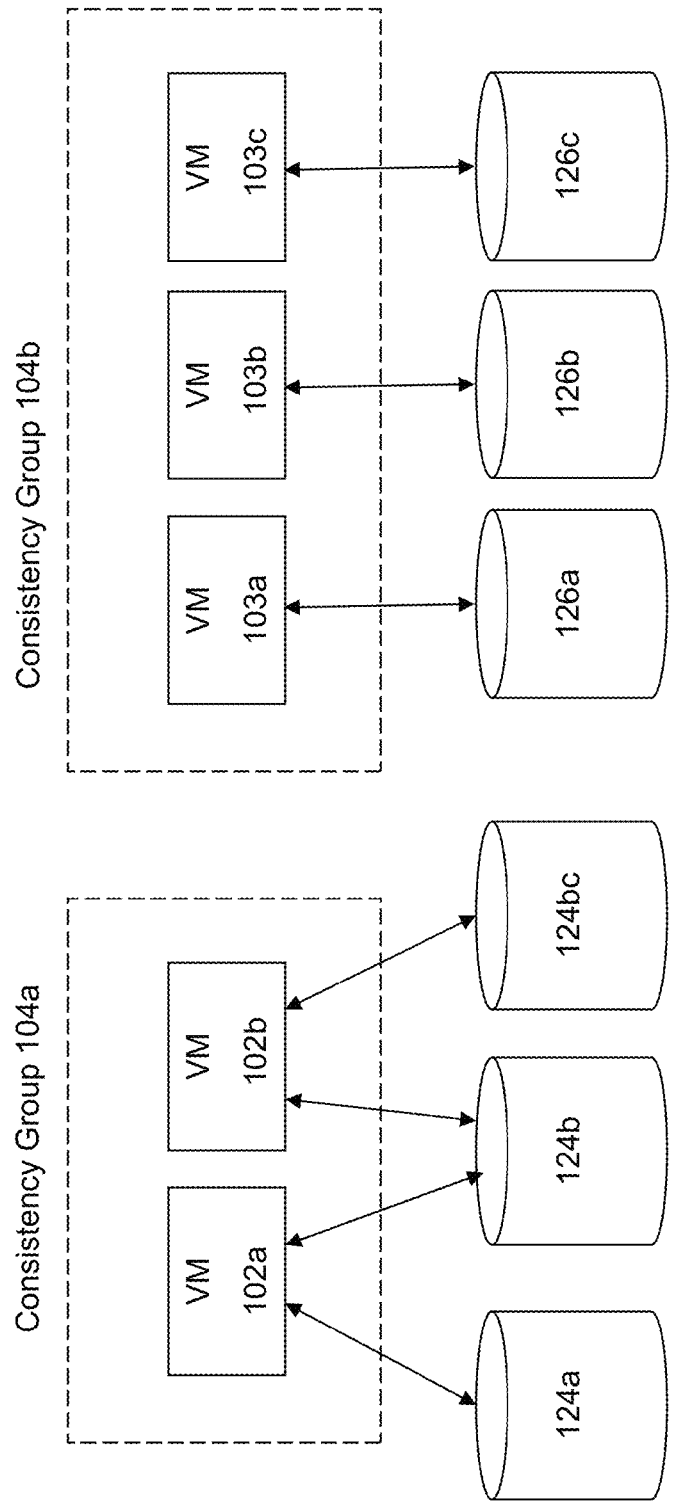
FIG. 1 illustrates VM-based consistency groups according to some embodiments of the invention.

FIG. 1 illustrates example consistency groups 104*a* and 104*b* according to some embodiments of the invention. Each consistency group 104*a* and 104*b* includes a group of VMs that need to be maintained to be crash consistent. This means that the state of the VMs in a respective consistency group must be maintained on a consistent basis across the member VMs after disaster recovery has occurred. The VMs in the consistency group are therefore snapshotted at the same point in time as if the snapshots occurred instantaneously.

There may be any number of VMs in a consistency group as required to maintain consistency across sets of related VMs. As illustratively shown in the figure, consistency group 104a includes two VMs 102a and 102b and consistency group 104b includes three VMs 103a, 103b, and 103c.

Each VM is associated with a set of resources that include information about the state of the VM. These resources include, for example, files associated with the VM such as log files, configuration files, and data files. The VMs may be associated with resources dedicated to that VM. For example, VM 103a is associated with dedicated resources 126a, VM 103b is associated with dedicated resources 126b, and VM 103c is associated with dedicated resources 126c. The VMs may also be associated with linked resources. For example, VM 102a and VM 102b are both associated with a linked resource 124b (e.g., a linked file). These VMs 102a and 102b are also associated with dedicated resources 124a and 124c, respectively.

According to some embodiments, the invention is implemented by ensuring that the state of the resources for VMs within the same consistency group are captured and maintained on a consistent basis.

Figure 2:
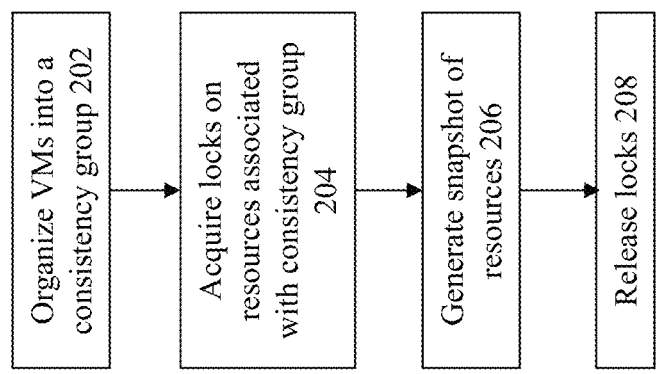
FIG. 2 shows a flowchart of an approach for VM-based consistency groups according to some embodiments of the invention.

FIG. 2 shows a flowchart of an approach to capture the state of resources for consistency groups according to some embodiments of the invention. At 202, some or all of the VMs in the system are organized into consistency groups. As noted above, there may be multiple consistency groups in the system, where each consistency group may include any number of VMs.

Any suitable basis can be used to decide upon the members of a consistency group. As just one example, the consistency group can be organized to provide for data consistency across multiple VMs. This ensures, for example, that data dependencies that exist across multiple VMs do not turn into inconsistencies after a disaster recovery. As another example, there may be recognition that a set of multiple VMs pertain to closely related users, data, hardware, and/or subject matter, such that the VMs should be grouped together into a common consistency group.

A set of metadata is maintained in the system to track the membership of consistency groups. In some embodiments, the consistency group is structured as a container object that includes the identifier of the VMs and/or VM resources that are mapped to the consistency group.

At 204, locks are acquired on the resources associated with the VMs of the consistency group. Lock management is a common approach that is used to synchronize accesses to shared resources. As noted above, the resource corresponds to any object pertaining to a VM to which shared access must be controlled. For example, the resource can be a file, a record, an area of shared memory, or anything else that can be shared by multiple VMs and/or entities in the system.

There are potentially many types of locks that may potentially be taken on the resource. In general, the lock should be of a type that precludes any modification to the resource while the system is in the midst of capturing the state of the resource. Examples of locks include, e.g., exclusive locks, protected read locks, and shared locks.

Once locks have been acquired on all of the appropriate resource, then at 206, a snapshot is taken of those resources. The snapshot is a recording of the state of the resource at a given moment in time. In effect, a synchronized snapshot is generated for every resource associated with the VMs in a consistency group that would be required in a disaster recovery situation to maintain the consistency across those multiple VMs in the same group.

The snapshot is then stored in a storage location that is predicted or anticipated to not share a common failure modality with the members of the consistency group. For example, a well-recognized failure mode in disaster scenarios is the failure of a power supply/source. Therefore, with recognition of this possible failure scenario, it would make sense for the snapshot(s) of VMs for nodes attached to a first power supply/source to be stored in a storage location that is associated with a second power supply/source. Once the snapshots have been appropriated captured and are confirmed to be safely stored, the locks can then be released at 208. In some embodiments, the locks on the resource are released after the resource has been snapshotted, such as where the snapshotted resource is kept aside to perform fault-tolerance (e.g., replication) without blocking further writes to the resource.

Any suitable approach can be used to take a snapshot of a resource. For example, consider the situation when the application and/or the VM has either in-memory or on-disk state that needs to be snapshotted. The in-memory and/or on-disk data for the application/VM is stored in a set of one or more virtualized storage components. A copy of the data within the virtualized storage components is made and/or identified to perform the snapshot.

To explain, consider if the resources for the application/VM are stored as virtual disks or "vdisk", which is a logical representation of storage space compiled from one or more physical underlying storage devices. A file comprises data within one or more vdisks that are associated with the file. Metadata may be used to map the resources to the underlying physical storage devices. More information about an exemplary approach to implement vdisks and its associated metadata is described in co-pending U.S. application Ser. Nos. 13/207,345 and 13/207,357, both filed on Aug. 10, 2011, which are hereby incorporated by reference in their entirety.

When taking a snapshot, a copy is made and/or identified of the vdisks associated with a resource. Any suitable can be taken to make this type of copy of the vdisks. In some embodiments, a copy-on-write approach is taken to make a copy of a vdisk when a change is made to that vdisk, where the previous version of the vdisk is still maintained. Both the previous and new version of the vdisk are associated with identifier numbers (e.g., "epoch" numbers) that can be used to distinguish between the different stored versions of the vdisks. For a given consistency group, snapshots for the vdisks associated with that consistency group would be taken at the same time, and therefore would be associated with the same epoch number.

In this way, any application can be snapshotted on a consistent basis, by implementing the application using virtualized storage (e.g., using the approach described in co-pending U.S. application Ser. Nos. 13/207,345 and 13/207,357) and then snapshotting the virtual storage components associated with the application. This permits the consistency groups to be established in a way that is non-intrusive to the application/VM, and in which no special hooks are required in the VM/application to ensure that a collection of VMs can be snapshotted such that they are consistent.

This approach also permits any application, even one without a native capacity for snapshots, to implement consistency groups. To explain, consider an application that does not natively provide a capacity to implement snapshots, such as most modern non-database and/or non-disaster recovery applications. Most applications that are not themselves database management systems (DBMSs) or failure/disaster systems only offer rudimentary capabilities to handle data, without even the concept of point-in-time snapshots. With the present invention, the underlying storage for these applications is implemented using a virtualization system, e.g., where the application/application node is virtualized as a virtual machine and/or where the application uses a virtualized storage infrastructure having virtual machines to manage its data. Using the above-described approach, consistent snapshots can then be taken of the data associated with the virtual machines that correspond to the application, even if the application code itself does not provide the ability to implement snapshots.

The actions of 204, 206, and 208 can be taken at any appropriate time periods, e.g., on a regular basis as established by a system administrator taking into account the needs to maintain up-to-date snapshots while balancing their costs. The snapshots can also be taken on an ad hoc basis at other time periods as well.

Figure 3:
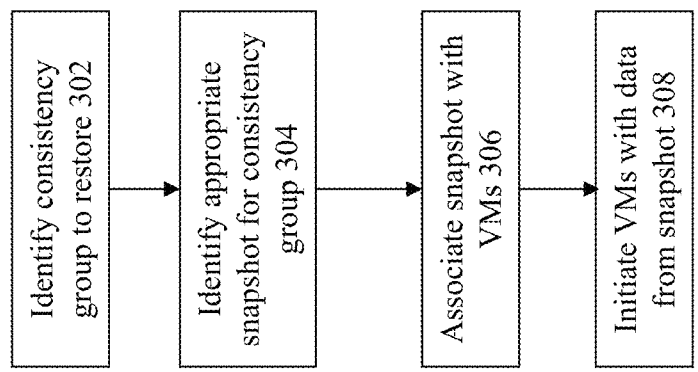
FIG. 3 shows a flowchart of an approach for recovering VM-based consistency groups according to some embodiments of the invention.

FIG. 3 shows a flowchart of an approach to restore the state of resources for VMs in a consistency groups after a disaster according to some embodiments of the invention.

At 302, identification is made of a consistency group that needs to be restored to implement disaster recovery. This may occur, for example, upon recognition of a disaster that has occurred which has brought down some or all of the VMs within a consistency group.

At 304, the appropriate snapshot(s) are identified for the consistency group to be restored. In some embodiments, the snapshots are stored within a hidden directory. The hidden directory is searched for the snapshot(s) of interest or the consistency group/VMs to be restored.

At 306, the identified snapshot(s) are associated with the VMs being restored to implement disaster recovery. For example, if the snapshots are stored in a hidden directory, then this step will move/copy the snapshots into a public namespace to be associated with the VMs that are being restored.

Thereafter, at 308, the VMs in the consistency group being restored are brought up using the data from the snapshot(s). Since the VMs are restored from snapshot(s) taken at a consistent point in time, this means that the VMs within the consistency group will be restored and brought up with an inherent consistency in their restored states.

Figure 4B:
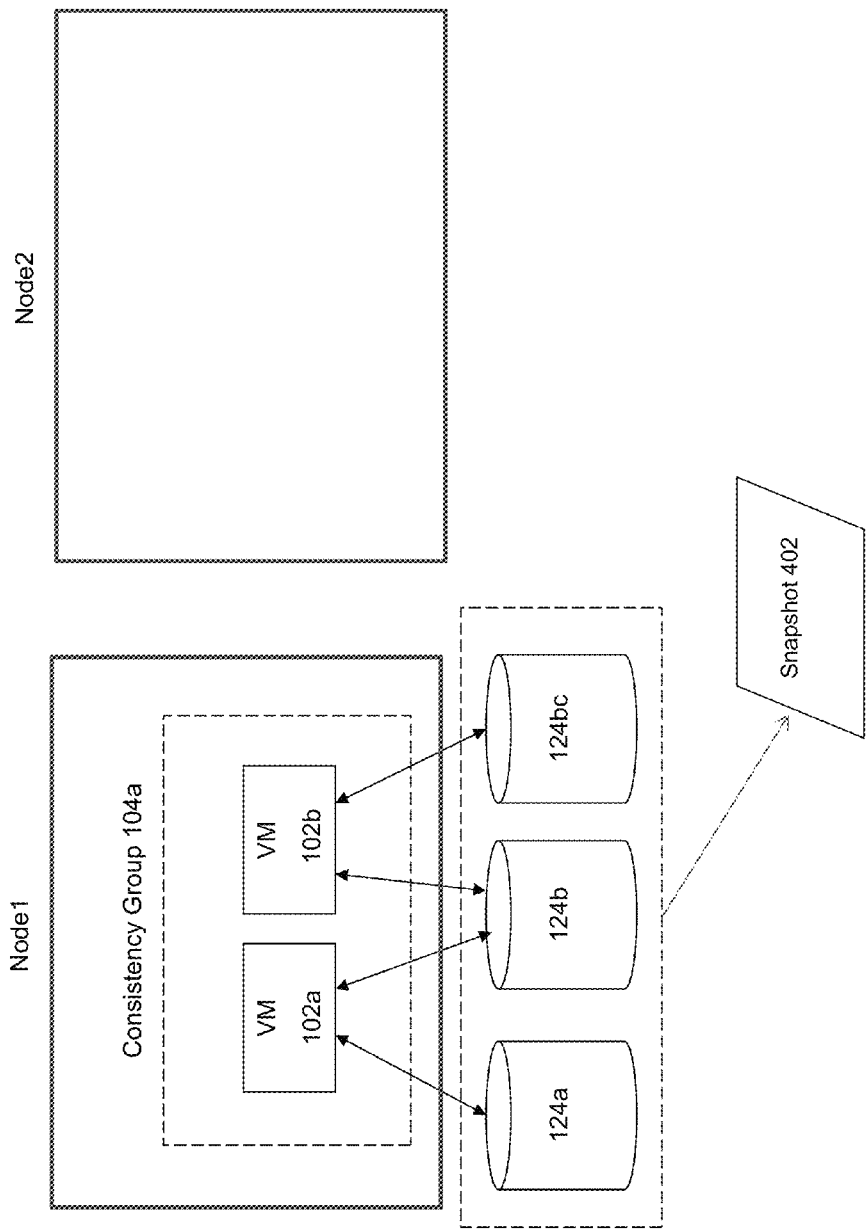

FIGS. 4A-E provide an illustrative example of the above-described approach to implement consistency groups. FIG. 4A shows a node 1 that is running VM 102*a* and VM 102*b*, both of which are members of the same consistency group 104*a*. These VMs 102*a* and 102*b* are associated with resources 124*a*, 124*b*, and 124*c*. As used herein, the term "node" refers to any appropriate computing entity and/or location, including without limitation, a machine, site, cluster, and/or system.

As illustrated in FIG. 4B, a snapshot 402 is taken of the resources 124*a*, 124*b*, and 124*c*. The snapshot 402 is taken to preserve a consistent state of 124*a*, 124*b*, and 124*c* at a specified moment in time.

Thereafter, as shown in FIG. 4C, a disaster occurs that results in failure of VMs 102*a* and 102*b*. Such a disaster may occur, for example, due to a hardware problem that takes down node 1. As a result, VMs 102*a* and 102*b* are no longer accessible to the user.

Disaster recovery is then pursued to bring VMs 102*a* and 102*b* back up. Since these two VMs are members for the same consistency group 104*a*, they must be restored in a manner that preserves the consistency of their restored states. It is assumed that the VMs will be restored using node 2 during the disaster recovery process.

Figure 4E:
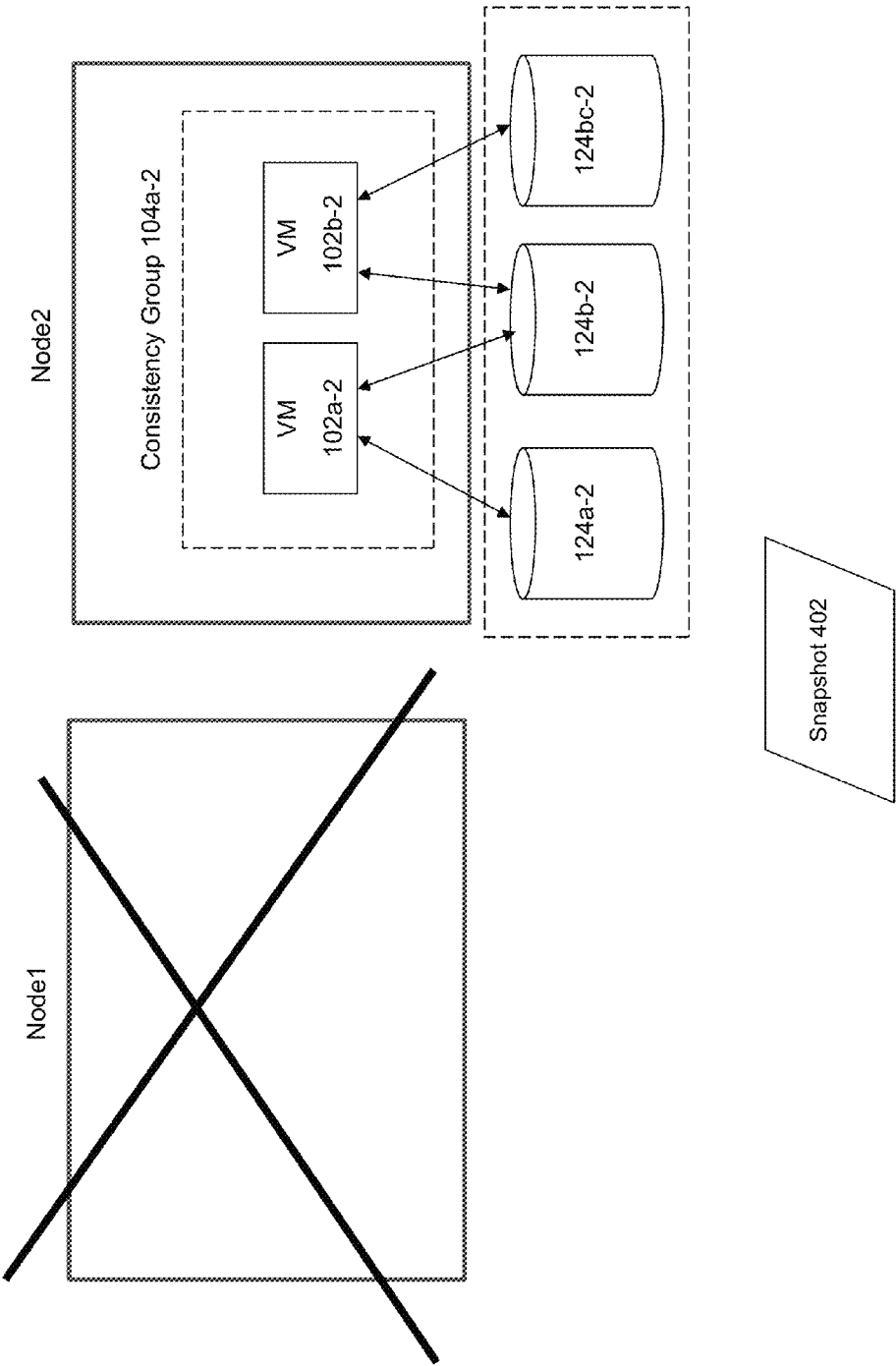

FIG. 4D illustrates identification of snapshot 402 as the appropriate snapshot to implement the restoration of the VMs. The snapshot 402 is associated with a restored set of resources 124*a*-2, 124*b*-2, and 124*c*-2 for the restored VMs 102*a*-2 and 102*b*-2. As illustrated in FIG. 4E, when these VMs 102*a*-2 and 102*b*-2 are brought up, the state of the resources 124*a*-2, 124*b*-2, and 124*c*-2 that are accessed permit the VMs 102*a*-2 and 102*b*-2 to be restored to a consistent state from the time that the snapshot 402 was captured. This means that the VMs 102*a*-2 and 102*b*-2 within the restored consistency group 104*a*-2 has been restored and brought up with an inherent consistency in their restored states.

Therefore, what has been described above is an improved approach to implement disaster recovery for VMs, where consistency groups are provided to link together two or more VMs for disaster recovery purposes.

System Architecture

Figure 5:
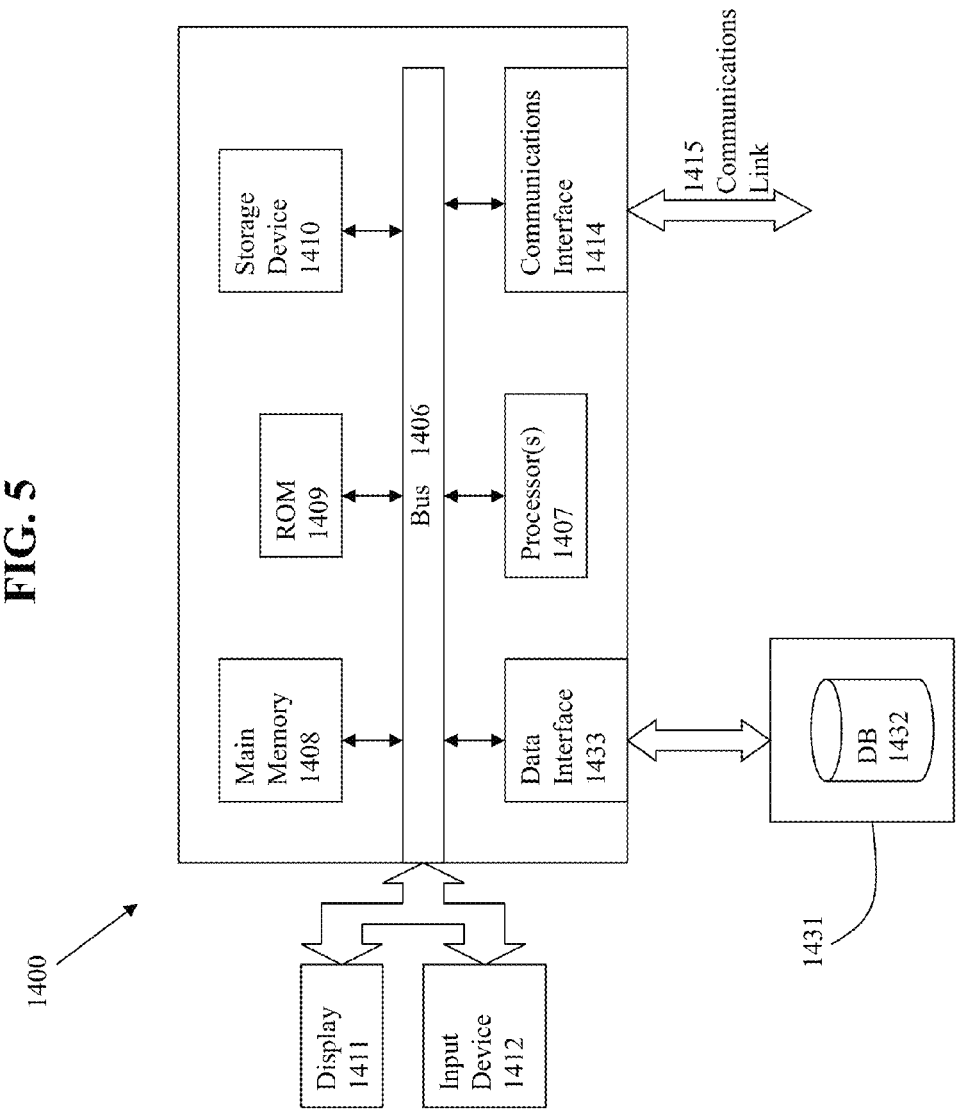
FIG. 5 is a block diagram of a computing system suitable for implementing an embodiment of the present invention.

FIG. 5 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed/stored in a database 1432 on medium 1431 through a data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for implementing a consistency group, comprising:
    locking resources associated with the members of a consistency group, wherein the members of the consistency group comprises a group of related virtual machines;
    generating a snapshot of the resources associated with the members of the consistency group; and
    releasing locks on the resource after the snapshot has been generated.

2. The method of claim 1, in which an application associated with the resources does not have a native functionality to generate the snapshot.

3. The method of claim 1, in which an application associated with the resources is not modified to include functionality to implement the consistency group.

4. The method of claim 1, in which the snapshot comprises a copy of one or more virtual disks associated with the resources.

5. The method of claim 4, in which the snapshot comprises identification of one or more identifier numbers associated with the copy of the one or more virtual disks associated with the resources.

6. The method of claim 4, in which copy-on-write functionality is used to create the copy of the one or more virtual disks associated with the resources, wherein the one or more identifier numbers is incremented upon making the copy.

7. The method of claim 1, in which metadata is maintained to track membership in the consistency group.

8. The method of claim 1, in which the snapshot is generated at a time period using at least one of: a regular basis or an ad hoc basis.

9. The method of claim 1, further comprising:
    identifying the consistency group to restore;
    identifying the snapshot for the consistency group; and
    initiating the group of related virtual machines using the snapshot.

10. The method of claim 9, in which the snapshot is associated with the group of related virtual machines.

11. The method of claim 1, in which disaster recovery is performed.

12. A system for implementing a consistency group, comprising:
    a processor;
    a memory for holding programmable code; and
    wherein the programmable code includes instructions for
        locking resources associated with the members of a consistency group, wherein the members of the consistency group comprises a group of related virtual machines;
        generating a snapshot of the resources associated with the members of the consistency group; and
        releasing locks on the resource after the snapshot has been generated.

13. The system of claim 12, in which an application associated with the resources does not have a native functionality to generate the snapshot.

14. The system of claim 12, in which an application associated with the resources is not modified to include functionality to implement the consistency group.

15. The system of claim 12, in which the snapshot comprises a copy of one or more virtual disks associated with the resources.

16. The system of claim 15, in which the snapshot comprises identification of one or more identifier numbers associated with the copy of the one or more virtual disks associated with the resources.

17. The system of claim 15, in which copy-on-write functionality is used to create the copy of the one or more virtual disks associated with the resources, wherein the one or more identifier numbers is incremented upon making the copy.

18. The system of claim 12, in which metadata is maintained to track membership in the consistency group.

19. The system of claim 12, in which the snapshot is generated at a time period using at least one of: a regular basis or an ad hoc basis.

20. The system of claim 12, further comprising instructions for identifying the consistency group to restore, identifying the snapshot for the consistency group, and initiating the group of related virtual machines using the snapshot.

21. The system of claim 20, in which the snapshot is associated with the group of related virtual machines.

22. The system of claim 12, in which the system performs disaster recovery.

23. A non-transitory computer program product embodied on a computer usable medium, the computer readable medium having stored thereon a sequence of instructions which, when executed by a processor causes the processor to execute a method for implementing a consistency group, the method comprising:
    locking resources associated with the members of a consistency group, wherein the members of the consistency group comprises a group of related virtual machines;
    generating a snapshot of the resources associated with the members of the consistency group; and
    releasing locks on the resource after the snapshot has been generated.

24. The computer program product of claim 23, in which an application associated with the resources does not have a native functionality to generate the snapshot.

25. The computer program product of claim 23, in which an application associated with the resources is not modified to include functionality to implement the consistency group.

26. The computer program product of claim 23, in which the snapshot comprises a copy of one or more virtual disks associated with the resources.

27. The computer program product of claim 26, in which the snapshot comprises identification of one or more identifier numbers associated with the copy of the one or more virtual disks associated with the resources.

28. The computer program product of claim 26, in which copy-on-write functionality is used to create the copy of the one or more virtual disks associated with the resources, wherein the one or more identifier numbers is incremented upon making the copy.

29. The computer program product of claim 23, in which metadata is maintained to track membership in the consistency group.

30. The computer program product of claim 23, in which the snapshot is generated at a time period using at least one of: a regular basis or an ad hoc basis.

31. The computer program product of claim 23, further comprising:
identifying the consistency group to restore;
identifying the snapshot for the consistency group; and
initiating the group of related virtual machines using the snapshot.

32. The computer program product of claim 31, in which the snapshot is associated with the group of related virtual machines.

33. The computer program product of claim 23, in which disaster recovery is performed.

34. A method for restoring a consistency group, comprising:
identifying a consistency group to restore to implement disaster recovery, wherein the consistency group comprises a group of related virtual machines;
identifying a snapshot associated with the consistency group; and
using the snapshot to bring up the virtual machines in the consistency group in a consistent manner.

35. A system for restoring a consistency group, comprising:
a processor;
a memory for holding programmable code; and
wherein the programmable code includes instructions for identifying a consistency group to restore to implement disaster recovery, wherein the consistency group comprises a group of related virtual machines; identifying a snapshot associated with the consistency group; and using the snapshot to bring up the virtual machines in the consistency group in a consistent manner.

36. A non-transitory computer program product embodied on a computer usable medium, the computer readable medium having stored thereon a sequence of instructions which, when executed by a processor causes the processor to execute a method for restoring a consistency group, the method comprising:
identifying a consistency group to restore to implement disaster recovery, wherein the consistency group comprises a group of related virtual machines;
identifying a snapshot associated with the consistency group; and
using the snapshot to bring up the virtual machines in the consistency group in a consistent manner.

* * * * *